(12) United States Patent
Zaifman et al.

(10) Patent No.: US 7,930,280 B2
(45) Date of Patent: *Apr. 19, 2011

(54) METHOD AND APPARATUS FOR MANAGING HIERARCHICAL COLLECTIONS OF DATA

(75) Inventors: Arthur Zaifman, Milburn, NJ (US); Carsten Lund, Berkley Heights, NJ (US); Frederick True, Bloomsbury, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 771 days.

This patent is subject to a terminal disclaimer.

(21) Appl. No.: 11/931,982

(22) Filed: Oct. 31, 2007

(65) Prior Publication Data

US 2008/0109493 A1 May 8, 2008

Related U.S. Application Data

(63) Continuation of application No. 11/198,149, filed on Aug. 8, 2005, now Pat. No. 7,310,652.

(51) Int. Cl.
*G06F 17/30* (2006.01)
(52) U.S. Cl. ...................................................... 707/705
(58) Field of Classification Search .................. None
See application file for complete search history.

(56) References Cited

U.S. PATENT DOCUMENTS

| 5,517,628 | A | 5/1996 | Morrison et al. |
| 5,920,857 | A | 7/1999 | Rishe et al. |
| 6,058,400 | A | 5/2000 | Slaughter |
| 6,108,654 | A | 8/2000 | Chan et al. |
| 6,230,064 | B1 * | 5/2001 | Nakase et al. .............. 700/90 |
| 6,233,576 | B1 | 5/2001 | Lewis |
| 6,609,085 | B1 * | 8/2003 | Uemura et al. ............. 702/189 |
| 7,203,635 | B2 | 4/2007 | Oliver et al. |
| 7,269,605 | B1 * | 9/2007 | Nguyen et al. ............ 707/999.2 |
| 7,310,652 | B1 * | 12/2007 | Zaifman et al. ........... 707/999.2 |
| 7,433,527 | B2 * | 10/2008 | Takayama et al. ........... 382/239 |
| 7,487,184 | B1 * | 2/2009 | Barrett-Lennard .... 707/999.104 |
| 7,580,760 | B2 * | 8/2009 | Allman et al. .................. 700/73 |
| 7,581,108 | B1 * | 8/2009 | Bohm et al. .................. 713/178 |
| 7,730,019 | B1 * | 6/2010 | Graham ................ 707/999.107 |
| 2002/0032696 | A1 * | 3/2002 | Takiguchi et al. ......... 707/500.1 |

OTHER PUBLICATIONS

Surajit Chaudhuri, et al. "Optimized stratified sampling for approximate query processing", Jun. 2007, ACM Press, ACM Transaction on Database Systems, vol. 32, Issue 2, pp. 1-50.

Charu C. Aggarwal, Hierarchical subspace sampling: a unified framework for high dimensional data reduction, selectively estimation and nearest neighbor search, ACM Press, International Conference on Management of Data, 2002, pp. 452-463.

Ben Liblit, et al., "Bug isolation via remote program sampling", ACM Press, Association for Computer Machinery, pp. 141-154.

* cited by examiner

*Primary Examiner* — Neveen Abel-Jalil
*Assistant Examiner* — Jacques Veillard

(57) ABSTRACT

A method and system provide for management of a collection of data records. The data records have associated therewith an identifier or code that indicates the most coarse level of granularity with which the data record is associated in a hierarchy of sampling subsets created across a range of granularity levels.

10 Claims, 4 Drawing Sheets

METHOD AND APPARATUS FOR MANAGING HIERARCHICAL COLLECTIONS OF DATA

RELATED APPLICATIONS

This application is a continuation of allowed U.S. application Ser. No. 11/198,149, filed Aug. 8, 2005 now U.S. Pat. No. 7,310,652, which is herein incorporated by reference.

BACKGROUND

The present invention is directed to a method and a system for managing collections of data. More specifically the present invention is directed to a method and a system for managing a hierarchy of subsets of data.

There are many environments in which it is desirable to monitor system operations and/or collect sets of data over certain time periods or in connection with the occurrence of certain events. These sets of data can be considered to be samples of data for a given time interval or in regards to the occurrence of some event or state transaction. One environment in which this periodic sampling is done is in the communications network arena. For example, it may be desirable to collect netflow data from routers in a wide area network (WAN) or local area network (LAN). In this arrangement the netflow information can be gathered by dedicated servers referred to as "collectors". It is known that it may be appropriate to take samples of the collected data rather than to store all of the raw data in a database. The sampling may be made up of collection of the relevant data that corresponds to a predetermined time interval or corresponds to the occurrence of a particular event. The time interval or event occurrence selected defines a sampling "granularity". One such data sampling technique is referred to as smart sampling. An example of an algorithm for smart sampling is:

```
Smart sampling algorithm
int smartSample (DataType data, int z) {
        static int count = 0;
        if (data.x>z)
                data.samplingFactor = 1.0;
        else{
                count+=data.x;
                if (count < z)
                        return 0;//drop
                else {
                        data.samplingFactor = ((double)z) / data.x;
                        count - count % z;
                }
        }
        return 1; //sample
}
```

For the ease of description, the remainder of this example will focus on a sampling algorithm which samples data over a given time interval, such as every five minutes. One of skill in the art will recognize, though that the duration of the time interval is variable, as is the decision to use time intervals to define sampling intervals.

Once the raw data is sampled it can be ingested into a database. The initial sampling interval is taken to be the initial, and smallest, sampling granularity. The size of the granularity, that is the sampling interval, in this example can be set by the data collector.

In the desired working environment it may be helpful to look at samples of data over larger granularities or time intervals. For example it may be desirable to know what the samples of data are for a one hour period, or a one day period rather than the five minute interval of the smallest granularity. Using a composable sampling algorithm, that is an algorithm that can successively sample, with increasing granularity, the resulting set from each previous round of sampling, a system can derive data for a larger sampling granularity from the set of data collected at the smaller granularity. The derived data set would be equivalent to a data set that could have been collected if the larger granularity had been used at the collection stage.

In the example given above each sample set for each five minute interval could be considered a separate bin of data. To derive data for a one hour time interval the sampling algorithm would be run over twelve "bins" of data corresponding to the smallest granular level. The derived data would be equivalent to data that would have been collected if the original granularity or time interval had been set for one hour. This derived data set is smaller than the data set in the twelve bins from which it was derived, but there is a corresponding loss of detail.

The derived data set for hour long intervals could be sampled again to create a data set for a higher level of granularity, for example a day. Thus 24 "one hour" bins of data would be sampled to create another data set, even further reduced. This set would be equivalent to the data that would have been collected if the original granularity bad been selected to be a 24 hour interval rather than the original 5 minute interval.

One problem that arises in this repeated smart sampling of the data is the problem of making sure that the sampled data are appropriately associated with the respective defined levels of granularity.

A couple of solutions have been proposed to this problem, but they each have drawbacks.

One solution involves replicating, within the database, the data that corresponds to each of the granularity levels. In this arrangement any data record that appears in each granularity level actually appears multiple times in the database, each instantiation having associated with it a key or code or identifier that indicates the particular granularity level that instantiation is associated with. While this solution arguably simplifies the process of sorting through the database for records for each granularity level, the replication and duplication increases the storage requirements of the database arrangement.

In a second proposed solution the data records are not replicated. Instead, each data record receives a separate identifier or key in connection with each granularity that is introduced into the system. As an example, consider bins of 5 minute time intervals sampled and re-sampled so as to create granularities of 1 hour, 24 hours, and seven days. Thus three additional levels of granularity will have been introduced. All of the data records get examined when one conducts a search or query at the smallest or finest level of granularity; a first subset of data records, something less than all of the data records, are in the next level of granularity, the one-hour bins; second subset, something less than the data records of the first subset are in the third granular level and so on. In the second proposed solution a flag for each granularity level is associated with each data record. If "0" indicates that the record is not contained at a particular granularity level and "1" indicates that it is, then if a data record has a key of 0011 this indicates the record is in the five minute interval set and the one hour subset, but not the one day or one week subsets (the flags in this example are arranged with smallest granularity on the right and increasing granularity going from right-to-left; alternative arrangements for the flags may be possible). This arrangement eliminates the need to replicate the data base.

However, this arrangement requires that a new key or identifier or code for every data record must be added every time a new level of granularity is created. That is, a new flag must be added to each data record with each sampling of the data so as to accurately and completely reflect those granularity levels with which the data records are associated.

It is desirable to have a data records management arrangement that avoids the need for duplication of records while avoiding having to introduce multiple keys or flags or identifiers for each data records.

SUMMARY OF THE INVENTION

The present invention provides an arrangement by which data can be managed even where differing levels of granularity are being considered without undue replication of data or undue expansion of the number of keys or codes or identifiers for each data record.

In one embodiment a method provides for each data record, collected at a first granularity level, to have associated with it a single key or identifier. As the collected records are re-sampled to provide for higher granularity views of the data, the single key or identifier may be changed to a different identifier to reflect the coarsest or highest level of granularity with which the record is associated. Thus each record may have a single identifier and yet not need to be replicated. When a search is to be done at a given granularity level, the system can query all of the data records having the code for that granularity level and all of the data records having codes of any of the granularity levels that are higher (or coarser) than the given granularity level. This will capture all of the pertinent data records.

In this arrangement two or more granularity level codes can be processed in parallel to perform a given query.

BRIEF DESCRIPTION OF THE DRAWINGS

The present invention is described with reference to the accompanying drawings. In the drawings, like reference numbers indicate identical or functionally similar elements.

DETAILED DESCRIPTION

Overview

In accordance with an embodiment of the present invention, each data record in a first granularity level is assigned a granularity identifier when the records in a compilation are sampled to create that first granularity level. When the data records corresponding to the first granularity level are sampled to create a second granularity level, those data records that appear in the second granularity level have their granularity level identifier replaced so that their new identifier corresponds to the second granularity level. The process is repeated for each successive sampling process and generation of granularity levels such that when sampling is completed, each data record in granularity level one to X has a single granularity level identifier indicative of the highest, most coarse, granularity level with which the data record is associated.

Figure 1:
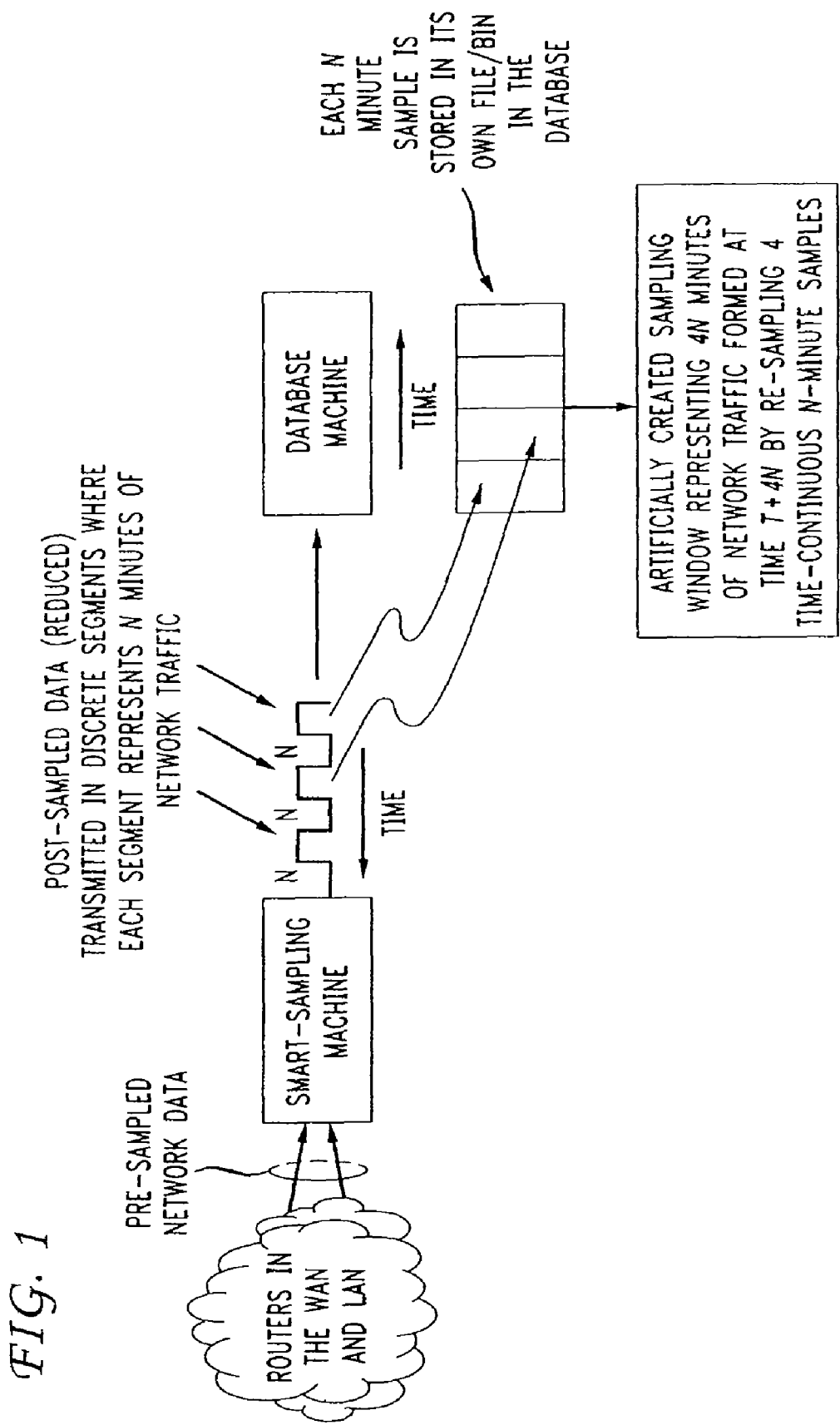
FIG. 1 is a block diagram illustrating a system in which an embodiment of the present invention may be used.

FIG. 1 illustrates a system in which data records are gathered, sampled and re-sampled. In this arrangement routers in a wide area network (WAN) or local area network (LAN), network characteristics, such as Cisco Netflow data can be collected by a collector, not shown. This collection of data corresponds to the pre-sampled network data in FIG. 1. This collection of data is sampled by a smart sampling machine. An example of a sampling algorithm for use in the smart sampling machine is a composable sampling process, meaning it can successively sample (with increasing value of z) the resulting set from each previous stage and the final set (e.g. at stage J) would be equivalent in terms of expected number of elements and variance to a single sampling of the original set using the threshold at stage J. For example, if $S_z$ referred to a set of sizes sampled by the optimal sampling function using a threshold of z, then:

$$S_{z_1} = P_{z_1}(S_{original}) \Rightarrow S_{z_2} = P_{z_2}(S_{z_1}) \Rightarrow S_{z_j} = P_{z_j}(S_{z_{j-1}})$$

Since the expected number of elements and variance of the sampled set depend on p(x) and r(x) (i.e., the optimal sampling and renormalization functions), we need to show:

$$r_{z_1,\ldots,z_j}(x) = r_{z_j}(x) \text{ since } -r(x) = \frac{x}{p(x)} \text{ or max }(x, z), \text{ then} \quad (1)$$

$$r_{z_1,\ldots,z_j}(x) = \max((z_1, \ldots, z_j), x) = \max(z_j, x) = r_{z_j}(x)$$

(*proven*!!!)

$$p_{z_1,\ldots,z_j}(x) = p_{z_j}(x) - \text{defining } p_{z_1,\ldots,z_j}(x) \text{ recursively as} \quad (2)$$

$p_{z_1,\ldots,z_{j-1}}(x) p_{z_j}\big(r_{z_1,\ldots,z_j}(x)\big)$ results in $p_{z,j}\big(r_{z_1,\ldots,z_j}(x)\big)$ equaling $\min\left(1, \frac{\max(z_{j-1}, x)}{z_j}\right)$.

Combining the previous equality with the property that any element in a sampled set $S_z$ is $\geq z$ causes $p_{z_{j-1}}(x) p_{z_j}(x)$ $\left(\text{or } \min\left(1, \frac{x}{z_{j-1}}\right) \min\left(1, \frac{\max(z_{j-1}, x)}{z_j}\right)\right)$ to equal $p_{z_j}(x)$ $\big(p_{z_{j-1}}(x)\big)$ when $z_{j-1} \leq z_j \leq z_{j+1}$.

The sampling technique reduces the collection of data creating "bins" of data records, each bin corresponding to "N" minutes of network traffic. These N bins of data records are shared in the database machine, with each "N" minute sample stored in its own file/bin in the database. It may be desirable in the given system to create an artificial sampling window having an interval that is some multiple of the initial sampling interval. For example the original interval N may be 5 minutes while it might be desirable to consider data over a 20 minute interval. The smart sampling machine can be used to group 4 "bins" of records and create a new sample set for the one hour interval. The new sample set would have a higher, coarser, granularity and presumably fewer data records.

Figure 2:
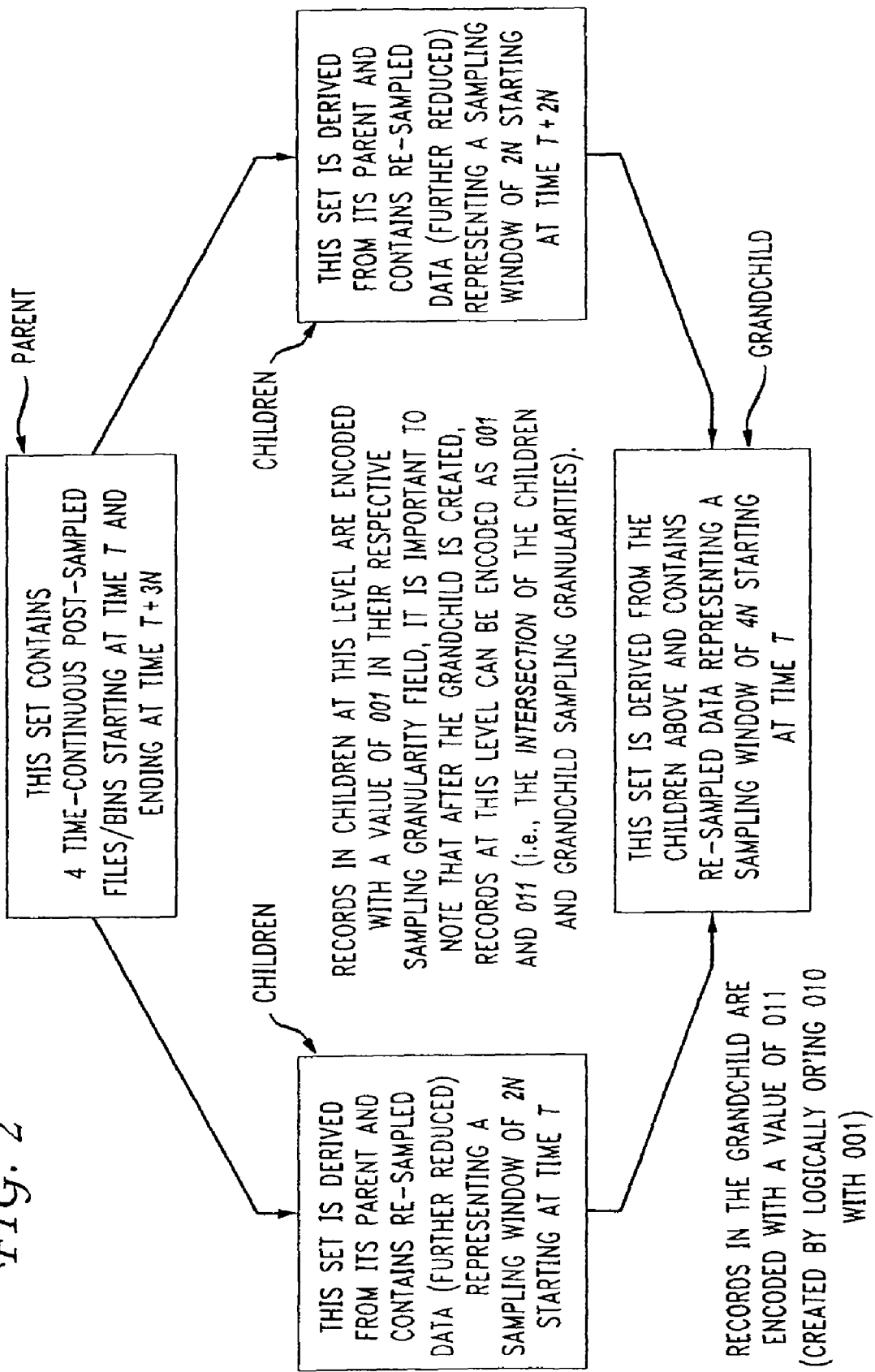
FIG. 2 is a flow diagram to illustrate an example of data collection in the system of FIG. 1.

FIG. 2 illustrates conceptually how the data records wind up being associated with difference sampling subsets as sampling is performed one or more times.

Element 201, referred to as the parent contains 4 time-continuous post-sampled bins starting at time T and ending at time T+3N, that is, data records for four time intervals at the finest level of granularity (5 minutes per interval in the above example).

The second level, the children (202A and 202B) are separate subsets derived by sampling the records of the parent over two consecutive, 2N intervals. That is, element 202A represents the set of data records created by a sampling of intervals T and T+N (or the first two intervals of the 4 intervals is the parent; the first ten minutes in the example). The element 202B represents the set derived by sampling the third and fourth intervals of the point, the second ten minutes in the example.

Further sampling can yield data over an even longer time interval, for example 20 minutes, by sampling the data records of element 202A and data records of element 202B.

The higher the level of granularity the fewer the data records corresponding to the set. All of the records at a given granularity level appear not only in that subset, but in the subset of each granularity level that is lower or finer than that given granularity level. In the illustrated example every data record in the grandchild subset appears in the children level and in the parent level.

The present invention provides a technique for assigning a single identifier to each data record so that efficient storage can be effected while still facilitating database queries at differing levels of granularity. For example, if a query is desirable across all of the data records at the finest granularity, all of the bins of records at the parent level are examined. If, however, the query is to be conducted at the child level it is desirable to examine all of the records that were part of the subset created by that first level of sampling. The subset of data records includes data records that are also found in one or more higher granularity levels. In the present invention the data records receive a granularity level identifier that identifies the highest granularity level of which the record is a member. This means that any data records that are at the child level, but not the grandchild level, have a child level identifier. Any of the data records for the child level that are in the grandchild level as well, but not a great-grandchild level (should such a sampling granularity exist) has a grandchild level identifier. When a query is to be done at the child level the query is applied to less than all of the parent records. Instead it is applied to the records having the child level identifier, records having the grandchild level identifier and each level identifier up to the coarsest granularity level. This will ultimately capture each of the data records initially identified when the sampling operation created the "child level" of granularity.

In connection with this embodiment of the invention, because the query is made to one or more granularity level identifier at a time, the query can be processed in parallel across the data records corresponding to the respective granularity level identifiers. This will actually provide the benefit of a more efficient query processing. Thus the present invention not only enhances the efficiency of the storage of the data records, it can be used to enhance the efficiency of querying the database.

Figure 3:
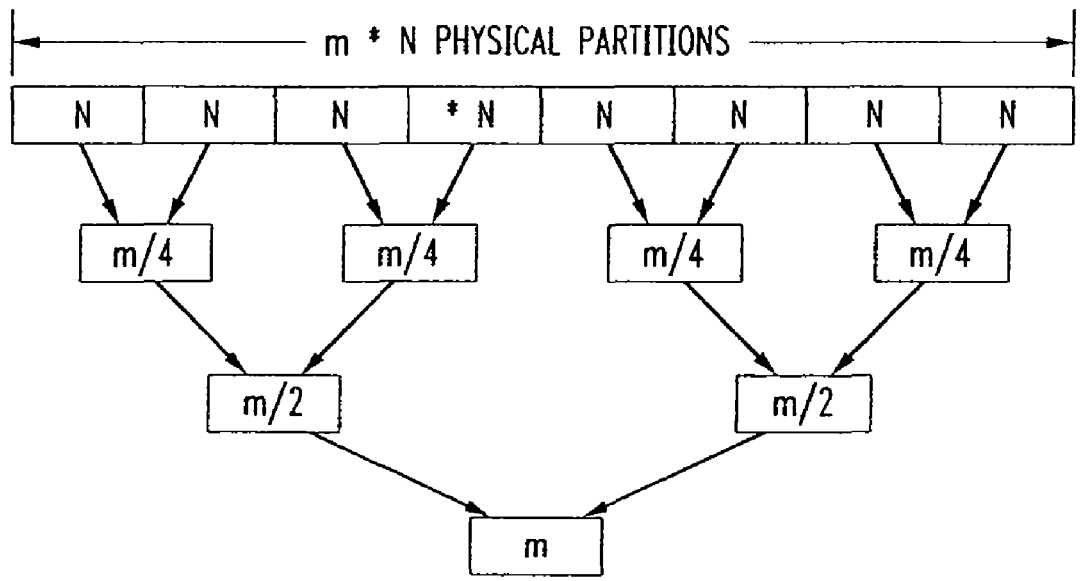
FIG. 3 is an alternative presentation of the data collection and sampling shown in FIG. 2.

FIG. 3 is alternative presentation of the information illustrated in FIG. 2. For example level 301 correspond to the parent level of FIG. 2 wherein there are M contiguous intervals of N time, where M=8 and N=five minutes. Thus there are 8 bins of data records covering a 40 minute interval. Level 302 corresponds to the child level of FIG. 2 wherein M/4=2, that is groups of 2 bins are sampled to create a first subset of data over four virtual bins, each corresponding to a 10 minutes window. Level 303 corresponds to the grandchild level of FIG. 2 where M/2=4, that is a second subset of data records is identified, associated with two "virtual bins" each having a 20 minute interval. Finally, a last level 304 is a great grandchild level (not shown in FIG. 2) wherein a third subset of data records is identified, associated with a virtual bin having a 40 minute interval.

Figure 4:
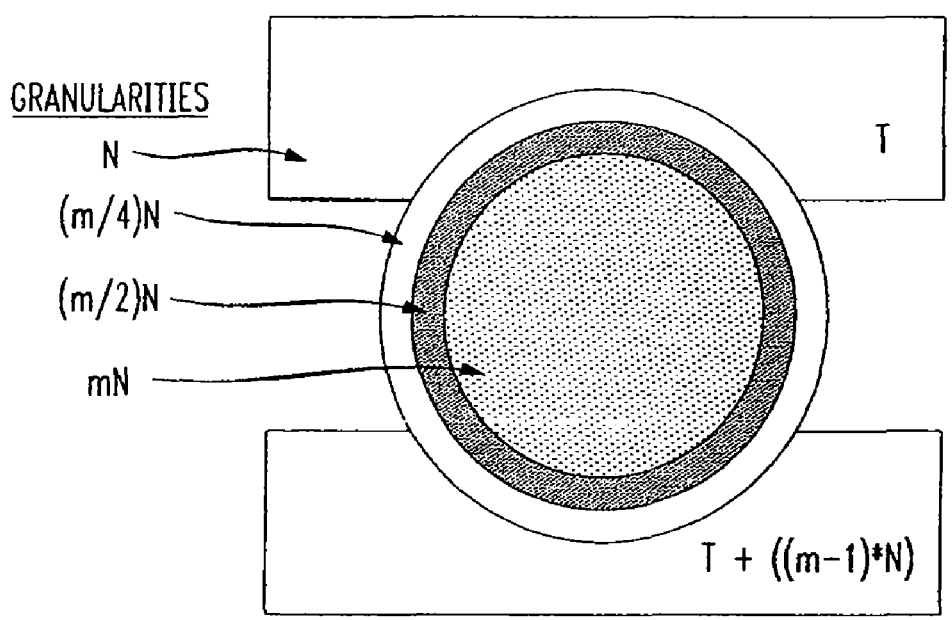
FIG. 4 is a Venn diagram to illustrate a relationship between data sets collected in the system of FIG. 1.

FIG. 4 is a diagram provided to help illustrate a relationship between the records in the various granularity levels. As the granularity becomes more coarse the number of records in a level becomes smaller. However, every record at a given granularity was taken as a sample from a finer level of granularity. Thus each record at a given granularity level is inherently a member of the granularity subset for each preceding, finer level of granularity. The present invention takes advantage of this fact by assigning to each data record an identifier associated with the highest, coarsest, granularity level in which the data record appears and then generates search queries using multiple identifiers to capture a universe of data records that matches all of the records that were within a given granularity irrespective of how many coarser levels the record may also appear in due to re-sampling.

The Process

Figure 5:
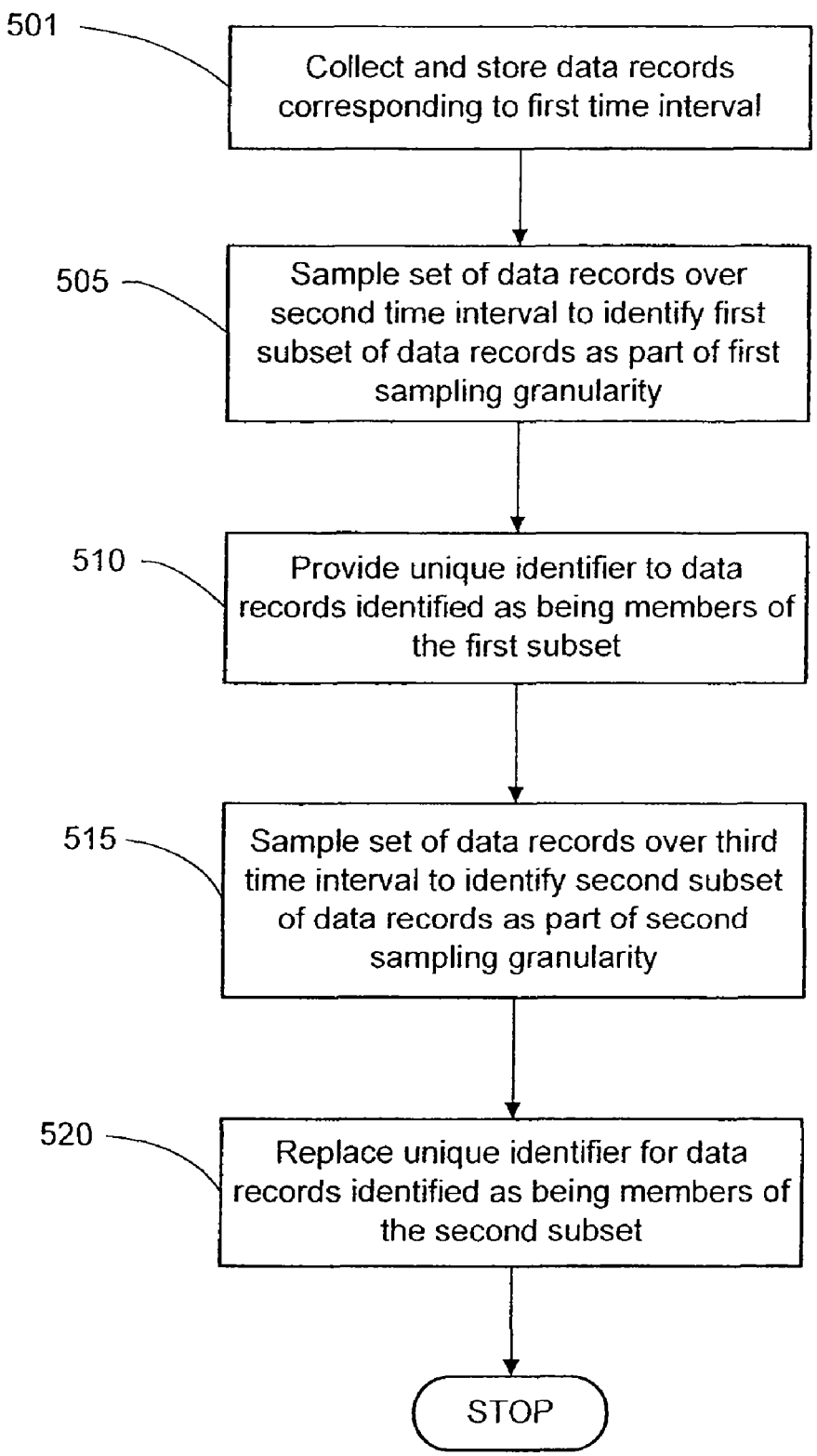
FIG. 5 is a flow chart describing a process flow for implementing an embodiment of the present invention.

FIG. 5 illustrates a flow chart for executing a process according to an embodiment of the present invention.

According to an embodiment of a process, data records are collected corresponding to a given time interval are stored in files or bins on an interval by interval basis, 501. The set of data records are sampled over some second interval, typically a multiple of the given time interval to identify a first subset of the data records as being part of a first sampling granularity level, 505. All of the records identified as being members of this first subset are provided a unique identifier corresponding to the first granularity level, e.g. 001, 510.

The subset of data records of said first granularity level are sampled over a third time interval, typically a multiple of the second time interval, to identify a second subset of the data records as being part of a second sampling granularity level, 515. All of the records identified as being members of this second subset have their unique identifier replaced to show that the record is a member of this second subset, 520. The unique identifier for those records which are part of the first subset, but not the second subset, remains unchanged. If a third granularity level is to be created the process of sampling and replacing unique identifiers is repeated. The result is that each record has a unique granularity level identifier that indicates the highest (coarsest) granularity level subset with which the record is associated.

In the three level example of FIG. 3 the unique identifiers could be 001 for the first granularity level (M/4), 011 for the second granularity level (M/2) and 111 for the third granularity level. In this example, a query directed to the coarsest granularity level, the third level, would only be directed to those data records in the database with the identifier 111. If a query is directed to the second granularity level, the process is directed to all of the records with identifier 011 and those records with identifier 111, the latter because the records at that higher granularity were samples taken from the second level of granularity. If a query is directed to the first granularity level the process is directed to all of the records with the identifier 001 and those records with identifiers 011 and 111, the latter two identifiers because all of the data records in these granularity levels were samples originally appearing in the first subset, that is the first granularity level.

When multiple identifiers are used to respond to or perform a query the search or query mechanism can process the identifiers in parallel, as described above, thereby enhancing the processing operation.

CONCLUSION

While various embodiments of the invention have been described above, it should be understood that they have been presented by way of example only, and not limitation. For example, the above example described data collections based on data sampled from a communications network. The invention is also usable in other environments where data is to be collected and grouped and then sampled to create information sets that reflect different granular views of the collected data. For example, this could be applied to any data collection/reporting system where the data collected is selected by a composable sampling algorithm. In addition, the recited examples refer to collections of data based on sampling intervals that are defined in relation to time intervals. The invention is also applicable where the sampling is to be event-driven rather than length-of-elapsed-time driven. Examples of such event-driven data collection arrangements include resampling the data collected for a particular duration to further reduce its volume when the duration exceeds a predetermined threshold. The disclosed embodiments illustrated up to three additional levels of sampling granularity. One of skill in the art would recognize that the present invention is applicable across more or fewer levels of granularity. The invention provides an identification that captures a highest, coarsest granularity level for a given record and then makes sure that all appropriate identifiers are employed to adequately respond to any query. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method for managing multiple subsets of data stored in a database, comprising:
    storing a superset of sampling data as a plurality of data records, the superset including a plurality of sampling interval data sets, each sampling interval data set including sampling data corresponding to a first time interval of a first time length where the superset includes sampling data for a plurality of sequential time intervals;
    sampling the sampling data in the superset over a second time interval of a second time length which is a multiple of the first time length to generate information identifying a subset of data for the superset, wherein the sampling creates a second sampling level associated with the subset of data that is identified, wherein the second sampling level includes a plurality of second time intervals;
    sampling data of the subset of data that is identified over a third time interval of a third time length which is a multiple of the second time length to generate information identifying a second subset of data from the superset; and
    assigning a code to each data record of the plurality of data records in the superset wherein the code identifies a highest sampling level with which each data record is associated.

2. The method of claim 1, further comprising:
    processing in parallel the plurality of data records associated with different codes.

3. A method for managing a database of records across a plurality of sampling granularities, comprising:
    storing a plurality of sets of data records, each set corresponding to a sample of data records over a first time interval, wherein the plurality of sets corresponds to a plurality of time intervals;
    sampling the plurality of sets of data records to identify a plurality of subsets of the data records as corresponding to a plurality of second time intervals, each second time interval corresponds to a plurality of the first time intervals, the plurality of subsets comprising a first sampling level;
    assigning a first code to each data record that is a member of the first sampling level;
    sampling the plurality of subsets of the data records associated with the first sampling level to identify a further subset of the data records as corresponding to a third time interval, the third time interval corresponding to a plurality of the second time intervals;
    the further subset comprising a second sampling level; and
    for each data record that is a member of the second sampling level, assigning a second code to replace the first code.

4. The method of claim 3, wherein a query is associated with the second sampling level, wherein the second code is identified and data records having the second code are used to respond to the query.

5. The method of claim 3, wherein a query is associated with the first sampling level, wherein the first code and the second code are identified, data records having the first code and data records having the second code being used to respond to the query.

6. The method of claim 5, wherein data records with the first code and data records with the second code are queried in parallel to respond to the query.

7. An apparatus for managing a database of records across a plurality of sampling granularities, comprising:
    means for storing a plurality of sets of data records, each set corresponding to a sample of data records over a first time interval, wherein the plurality of sets corresponds to a plurality of time intervals;
    means for sampling the plurality of sets of data records to identify a plurality of subsets of the plurality of sets of data records as corresponding to a plurality of second time intervals, each second time interval corresponds to a plurality of the first time intervals, the plurality of subsets comprising a first sampling level;
    means for assigning a first code to each data record that is a member of the first sampling level;
    means for sampling the plurality of subsets associated with the first sampling level to identify a further subset of the data records as corresponding to a third time interval, the third time interval corresponding to a plurality of the second time intervals;
    the further subset comprising a second sampling level; and for each data record that is a member of the second sampling level, assigning a second code to replace the first code.

8. The apparatus of claim 7, wherein a query is associated with the second sampling level, wherein the second code is identified and data records having the second code are used to respond to the query.

9. The apparatus of claim 7, wherein a query is associated with the first sampling level, wherein the first code and the second code are identified, data records having the first code and data records having the second code being used to respond to the query.

10. The apparatus of claim 9, wherein data records with the first code and data records with the second code are queried in parallel to respond to the query.

* * * * *